United States Patent
Casado Magaña et al.

(10) Patent No.: US 9,481,458 B2
(45) Date of Patent: Nov. 1, 2016

(54) DEVICE AND METHOD FOR USE WITH UNMANNED AERIAL VEHICLES

(71) Applicant: The Boeing Company, Seal Beach, CA (US)

(72) Inventors: Enrique Juan Casado Magaña, Madrid (ES); David Esteban-Campillo, Madrid (ES); David Scarlatti Jiménez, Madrid (ES); Ivan Maza, Cadiz (ES); Fernando Caballero, Sevilla (ES)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 14/264,636

(22) Filed: Apr. 29, 2014

(65) Prior Publication Data

US 2014/0319272 A1    Oct. 30, 2014

(30) Foreign Application Priority Data

Apr. 29, 2013    (EP) .................................... 13382159

(51) Int. Cl.
*B64F 1/00*    (2006.01)
*B64C 39/02*    (2006.01)
(Continued)

(52) U.S. Cl.
CPC ............ *B64C 39/024* (2013.01); *B60L 3/0046* (2013.01); *B60L 3/12* (2013.01); *B60L 11/1805* (2013.01); *B60L 11/1816* (2013.01); *B60L 11/1822* (2013.01); *B60L 11/1824* (2013.01);
(Continued)

(58) Field of Classification Search
CPC ... B64F 1/04; B64C 39/024; B64C 2201/06; B64C 2201/066; B64C 2201/18; B64C 2201/042; B60L 11/1822; B60L 11/1824; B60L 3/0046; B60L 3/12; B60L 2200/10; B60S 5/06; B65G 63/025; B65G 63/003; B65G 63/006

USPC .................................. 414/396, 401; 320/109
See application file for complete search history.

(56) References Cited

U.S. PATENT DOCUMENTS 8,511,606 B1 *    8/2013    Lutke .................... B64C 39/028
                                                    244/100 R
8,862,288 B2 *    10/2014    Vavrina ............... B60L 11/1822
                                                    320/109

(Continued)

FOREIGN PATENT DOCUMENTS

DE    102007003458 A1    7/2008
EP        2664539 A1 *    11/2013    .......... B64C 39/024
WO    WO 2012064891 A2 *    5/2012    ............. B64F 1/125

OTHER PUBLICATIONS

An Extended European search report for co-pending EP patent application No. EP 13382159, dated Nov. 21, 2013 (7 pgs).
Suzuki et al., "Automatic Battery Replacement System for UAVs: Analysis and Design," Journal of Intelligent and Robotic Systems; Theory and Applications, vol. 65, No. 1-4, Sep. 9, 2011, pp. 563-586.

*Primary Examiner* — Philip J Bonzell
(74) *Attorney, Agent, or Firm* — Armstrong Teasdale LLP

(57) ABSTRACT

An autonomous battery replacement station for an unmanned aerial vehicle (UAV) is provided. The UAV includes a replaceable battery. The station includes (a) a landing platform configured to receive the UAV, (b) a storage location configured to store a replacement battery for the UAV, and (c) a means for swapping the replaceable battery on the UAV with a replacement battery from the storage location.

20 Claims, 11 Drawing Sheets

(51) Int. Cl.
*B64F 1/04* (2006.01)
*B60L 11/18* (2006.01)
*B60L 3/00* (2006.01)
*B60L 3/12* (2006.01)

(52) U.S. Cl.
CPC .......... *B64F 1/04* (2013.01); *B60L 2200/10* (2013.01); *B60L 2220/42* (2013.01); *B64C 2201/027* (2013.01); *B64C 2201/042* (2013.01); *B64C 2201/066* (2013.01); *B64C 2201/18* (2013.01); *B64C 2201/20* (2013.01); *Y02T 10/648* (2013.01); *Y02T 10/7005* (2013.01); *Y02T 10/7072* (2013.01); *Y02T 90/121* (2013.01); *Y02T 90/124* (2013.01); *Y02T 90/14* (2013.01)

(56) References Cited

U.S. PATENT DOCUMENTS

| 2004/0211862 | A1* | 10/2004 | Elam | A63H 27/02 244/58 |
| 2011/0251935 | A1* | 10/2011 | German | B60S 5/06 705/30 |
| 2014/0124621 | A1* | 5/2014 | Godzdanker | B64F 1/22 244/110 E |
| 2014/0129059 | A1* | 5/2014 | Scarlatti | G05D 1/00 701/16 |

* cited by examiner

DEVICE AND METHOD FOR USE WITH UNMANNED AERIAL VEHICLES

CROSS-REFERENCE TO RELATED APPLICATION

This application claims priority to European patent application No. EP13382159.5, entitled "DEVICE AND METHOD FOR USE WITH UNMANNED AERIAL VEHICLES," filed Apr. 29, 2013, the disclosure of which is incorporated herein by reference in its entirety.

BACKGROUND

This invention relates to a device and a method for use with unmanned aerial vehicles (UAVs) such as, for example, quadrotors.

Small UAVs, such as quadrotors, are in current use for a variety of surveillance applications. Such UAVs are typically battery powered. Battery time/battery life is a known limiting factor in the use of UAVs where the surveillance mission flight time, for example is longer than about 15-20 minutes (the precise flight time depends upon a variety of factors such as UAV payload, battery manufacturer, atmospheric conditions, etc.).

Present techniques seek to address the critical flight time limitation caused by the battery, through improvements in UAV/battery design. For example, techniques have been developed to increase the time to discharge of the battery, to improve (i.e. decrease) the recharge duration, and/or to improve the efficiency of energy use of the battery by addressing design aspects of the UAV itself. Whilst such improvements have resulted in incrementally increased flight times, still there exists a fundamental problem with the limitations provided by existing arrangements.

BRIEF DESCRIPTION

In one aspect, an autonomous battery replacement station for an unmanned aerial vehicle (UAV) is provided. The UAV includes a replaceable battery. The station includes (a) a landing platform configured to receive the UAV, (b) a storage location configured to store a replacement battery for the UAV, and (c) a means for swapping the replaceable battery on the UAV with a replacement battery from the storage location.

In another aspect, an autonomous battery replacement system for an unmanned aerial vehicle (UAV) is provided. The UAV includes a replaceable battery. The battery replacement system includes (a) a dock configured to receive the UAV, (b) a conveyor belt configured to deliver the UAV to the dock, and (c) a means for swapping the replaceable battery on the UAV at the dock with a replacement battery.

In yet another aspect, a method of autonomously replacing a replaceable battery in an unmanned aerial vehicle (UAV) is provided. The method includes (a) receiving the UAV upon a landing platform of a battery replacement station, (b) transporting the UAV to a battery replacement location, (c) detecting a presence of the UAV at the battery replacement location, (d) detaching the replaceable battery from the UAV, and (e) automatically attaching a replacement battery to the UAV.

DETAILED DESCRIPTION

Figure 1A:
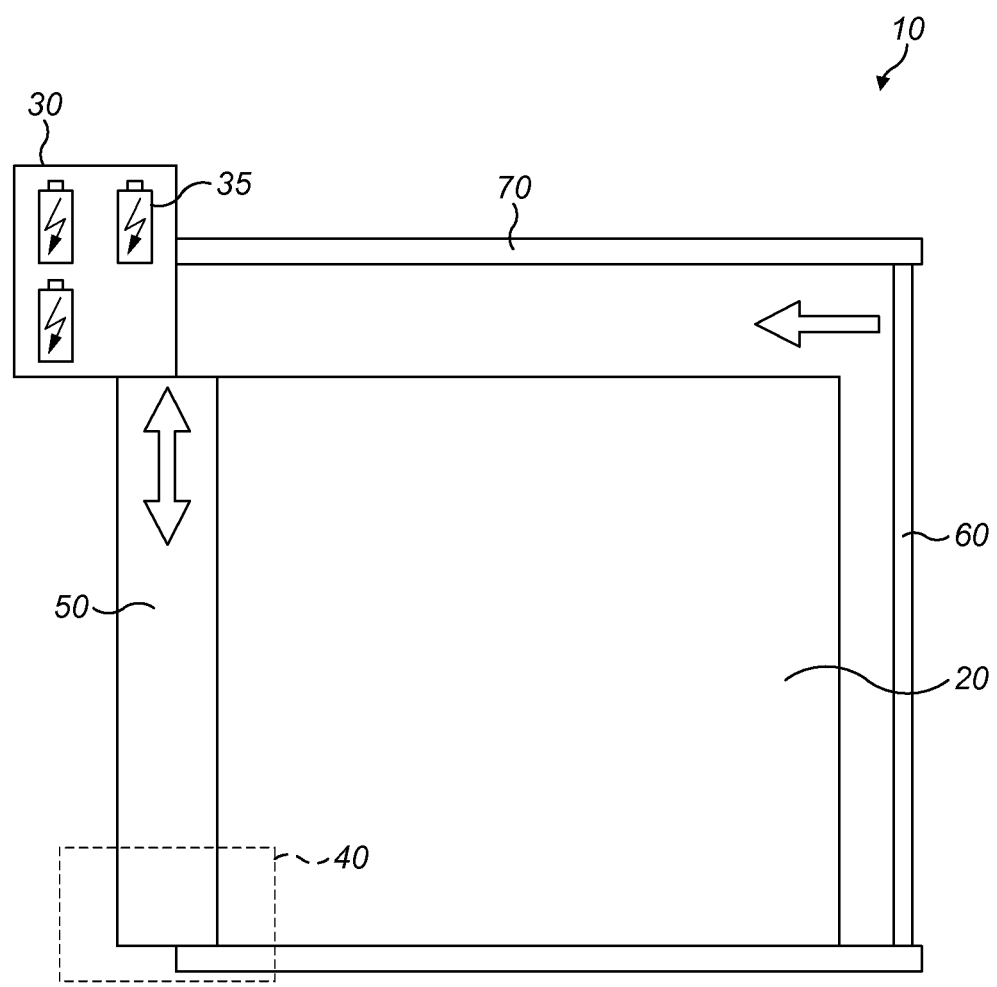
FIGS. 1a and 1b show, respectively, a top plan view and a perspective view of a station having a landing pad, the station embodying the present invention.

The device and methods described herein provide an autonomous battery replacement station. The described device and methods allow for swapping of the onboard battery of a UAV, when it reaches a predetermined lower limit of energy, with a replacement charged battery. The process is automated so that no human intervention is necessary; in some embodiments, for example, an onboard processor on the UAV determines when the battery energy level has reached the predetermined lower limit, and prompts the UAV to return to the battery replacement station. Here, for example, robotic devices can be employed to bring the UAV and the replacement battery together. In some embodiments, the station aligns the UAV and the replacement battery.

The described device and methods include a UAV with a means for engaging with the station, such as one or more legs, and a battery. The described device and methods also provide for a battery detachment arrangement. For example, the existing UAV battery may be held in place upon the UAV using permanent magnets. Then, optionally, an electromagnet can be energized when it is desired to swap the existing battery for a replacement battery, so as to overcome the attractive force of the permanent magnets and allow the battery to be removed.

The described device and methods also provide for autonomously replacing a battery in a UAV.

In addition to permitting continuous autonomous intelligence, surveillance and reconnaissance (ISR), for example, using unmanned vehicles, the described device and methods allow for the lower energy threshold (the point at which the UAV must return to the station for safety reasons) to be set relatively conservatively. Prior art UAVs were required to eke out as much battery life as possible leading to potential safety risks to the UAV. By providing autonomous battery swapping, the need to seek maximum possible flight time is reduced.

The described device and methods also provide a novel adaptor arrangement to permit rapid, accurate and autonomous connection and disconnection between a battery and a UAV. The described device and methods include an adaptor for connection and disconnection between a UAV and a battery therefor, the adaptor comprising a first part connectable to the UAV and a second part connectable to the battery, wherein the first part of the adaptor comprises a first connector arrangement, and the second part of the adaptor comprises a second connector arrangement, the first and second connector arrangements being adapted so as to cooperate and hold the first and second adaptor parts together when in use. The adaptor further comprises an electromagnet operable selectively to provide a force to separate the first and second parts of the adaptor when held together by the cooperating first and second connector arrangements.

In some embodiments, the first connector arrangement comprises one or more permanent magnets. The second connector arrangement may additionally or alternatively comprise one or more permanent magnets; if both the first and the second connector arrangements contain permanent magnets, then it will be understood that they should be of opposed polarity so as to attract one another when cooperating. In certain embodiments, the first connector arrangement comprises a plurality of permanent magnets each of a first polarity and having a first end profile, while the second connector arrangement comprises a plurality of permanent magnets each of a second polarity and having a second end profile which engages with the first end profile of each of the permanent magnets of the first connector arrangement.

The described device and methods also provide a UAV having the first part of the adaptor mounted thereupon, and a battery having the second part of the adaptor mounted thereupon. The described device and methods also include the combination of a UAV upon which the first part of the adaptor is mounted, and a battery upon which the second part of the adaptor is mounted, the UAV and battery being connected together by cooperation of the first and second connector arrangements, but disconnectable from one another by selective operation of the electromagnet to force the first and second adaptor parts to separate.

The described device and methods also provide for a connection and disconnection between a UAV and a battery.

Figure 1B:
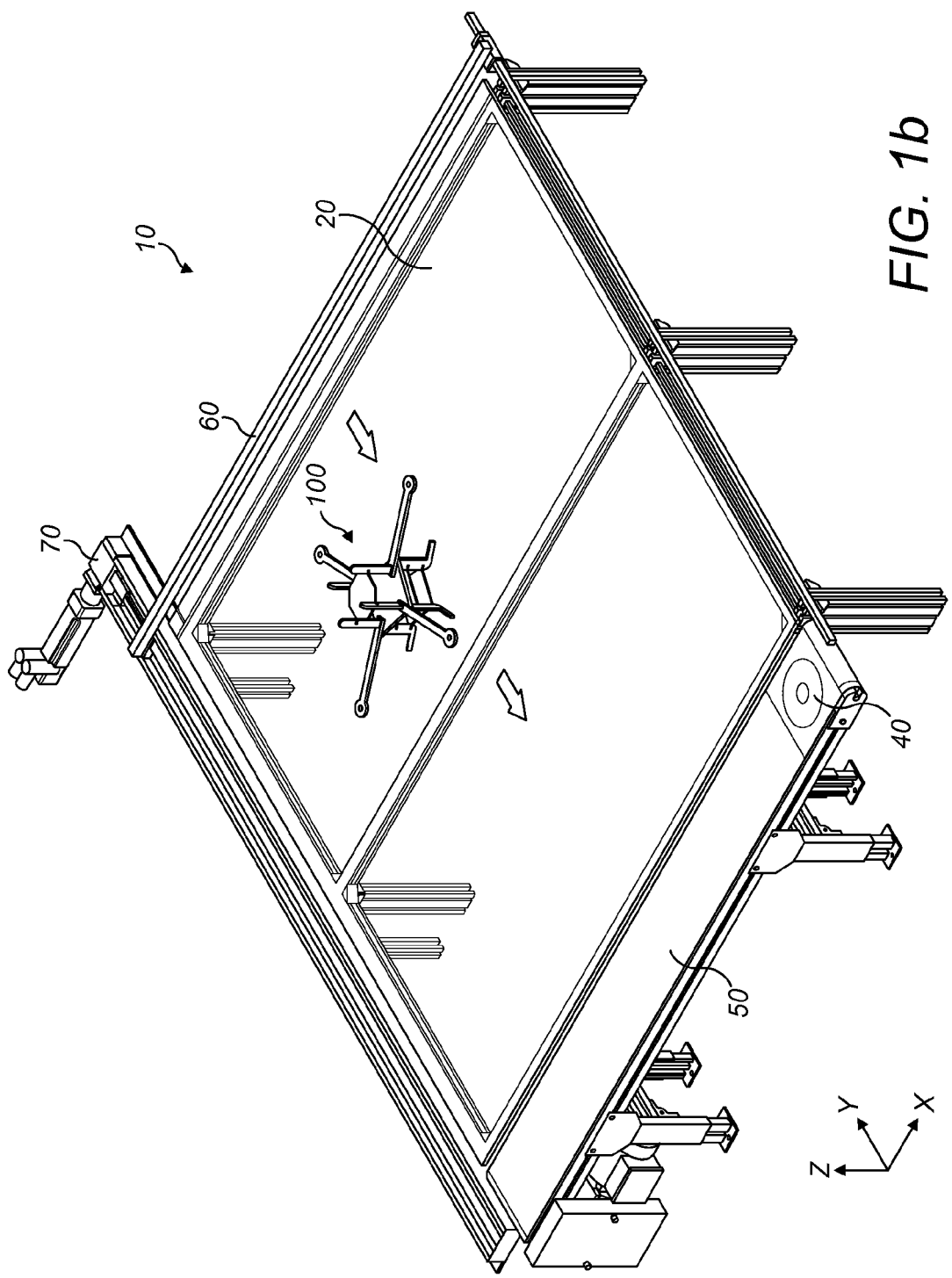

Referring more particularly to the drawings, FIG. 1a shows a schematic plan view of an autonomous battery replacement station 10. FIG. 1b shows the autonomous battery replacement station 10 in perspective view. The autonomous battery replacement station 10 includes a landing platform or pad 20 which is planar and onto which, in use, an unmanned aerial vehicle (UAV), such as UAV 100, can alight when it is desired to change the battery on that UAV.

The autonomous battery replacement station 10 also includes a battery storage location 30 which is adjacent to the landing pad 20. The battery storage location 30 includes one or more batteries. As will be explained below in connection with FIGS. 3a-3i, the battery storage location 30 stores replacement batteries 35, which are charged and which are to be used as replacement batteries on a UAV arriving at the autonomous battery replacement station 10. The battery storage location 30 may also store drained batteries removed from the UAV, again as will be explained below in connection with FIGS. 3a-3i. Optionally, the battery storage location 30 may contain connectors and a power supply to allow charging of batteries in the battery storage location 30.

The autonomous battery replacement station 10 also includes a battery replacement location or dock 40, shown with a dotted line in FIG. 1. Replacement of the battery on a UAV arriving at the autonomous battery replacement station 10 takes place in the dock 40. A battery transporter in the form of a conveyor belt 50 is located between the battery storage location 30 and the dock 40 for transport of batteries between these two locations.

The autonomous battery replacement station 10 also includes a moveable member in the form of a bar 60 mounted upon a linear actuator 70. The linear actuator moves the bar 60 across the landing pad 20 for engagement with the UAV 100 on the landing pad 20.

Figure 2:
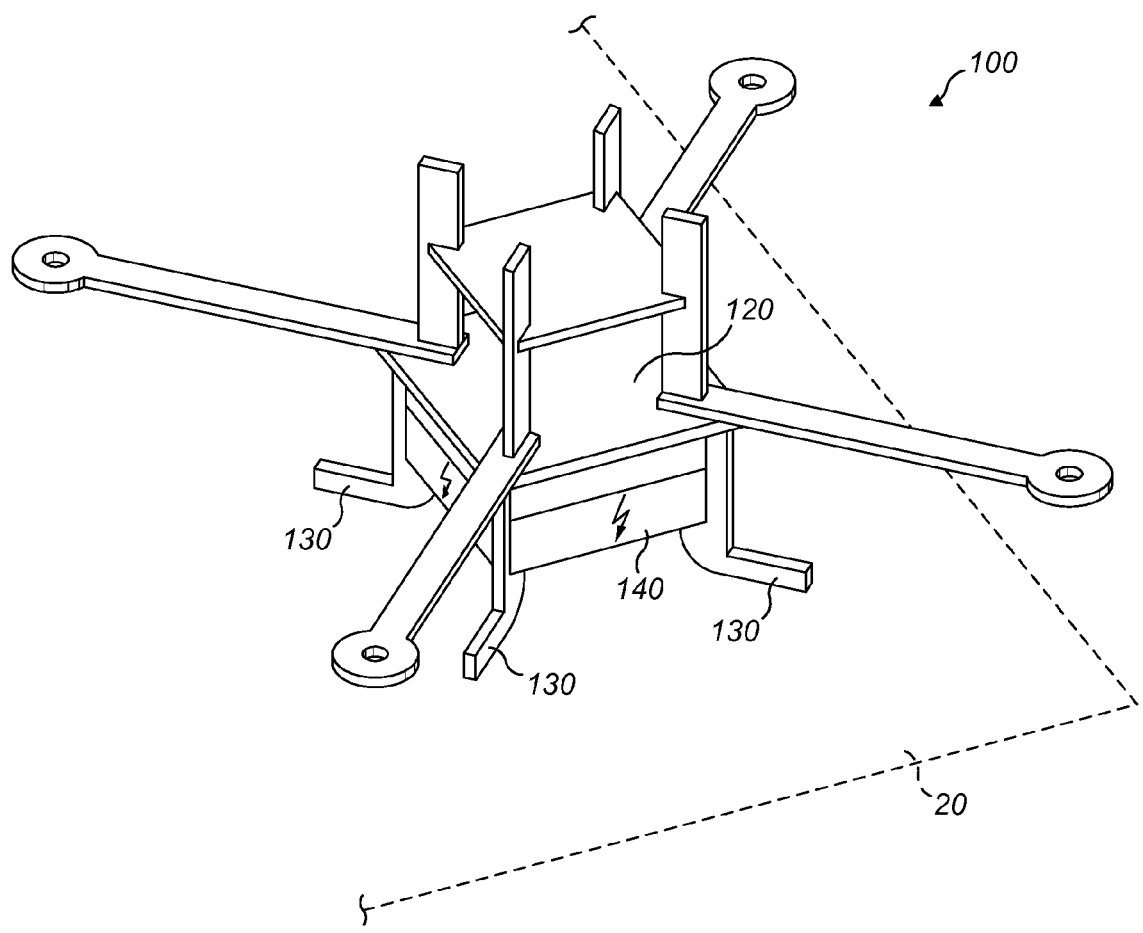
FIG. 2 shows a schematic perspective view of a UAV suitable for use with the station of FIG. 1 and having a battery.

Turning now to FIG. 2, the schematic drawing of an embodiment of UAV 100 which is suitable for use with the autonomous battery replacement station 10 of FIG. 1 is shown. The UAV 100, in the embodiment of FIG. 2, is a quadrotor comprising four horizontally mounted rotors, each linked to a UAV body 120. In FIG. 2, only the supports for the rotors themselves are shown, for clarity. The UAV body 120 has a plurality of projections in the form of legs 130 spaced around the extremities of the body and extending therefrom. The UAV body 120 also carries a UAV battery 140. This battery is removably connected to the UAV body 120 using cooperating adaptors which will be described in further detail in connection with FIGS. 7 and 8 below. The body also contains electric motors to drive the four rotors, control electronics and an antenna for receiving and transmitting signals. These components are known in the art as such and are not shown in FIG. 2 for the sake of clarity.

Figure 3A:
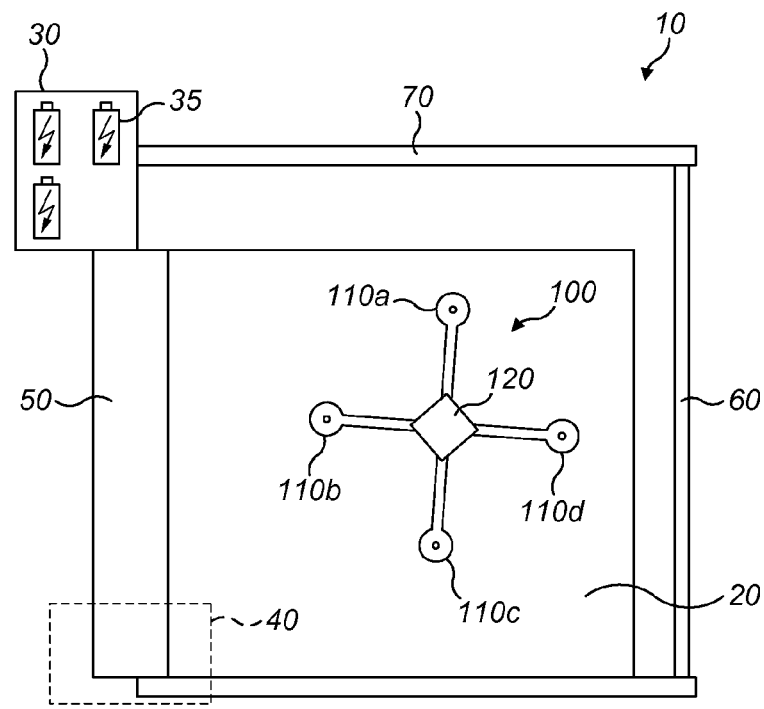
FIGS. 3a-3i show the successive states in the replacement of the battery of the UAV of FIG. 2, using the station of FIG. 1, when a UAV has alighted upon the landing pad thereof.
Figure 3B:
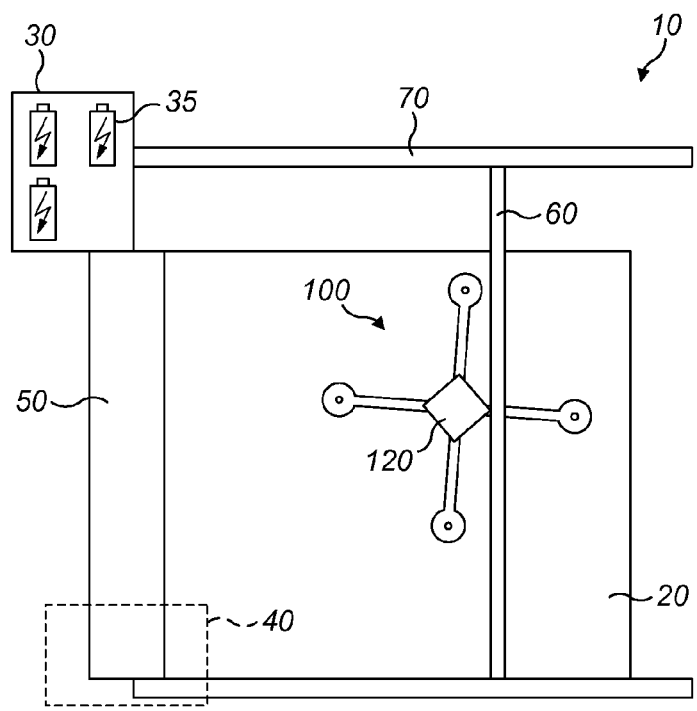
Figure 3C:
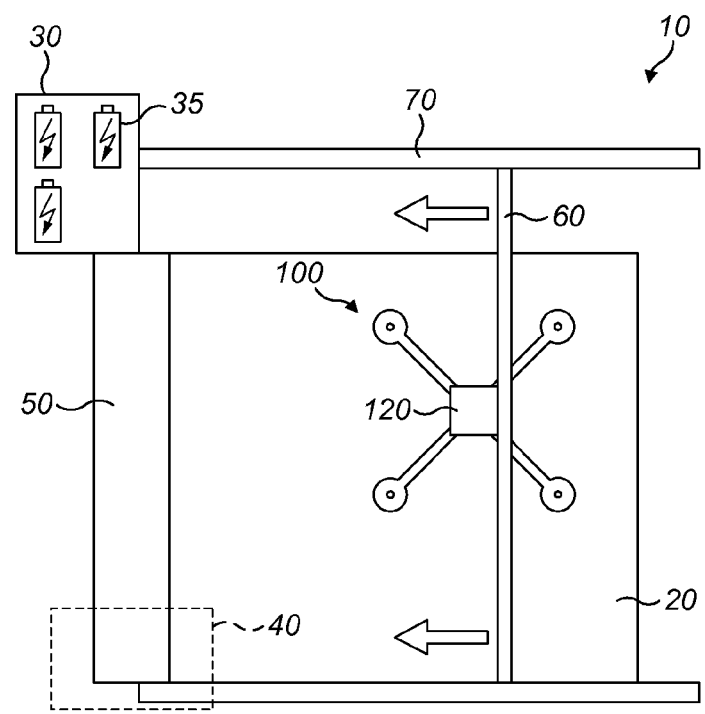
Figure 3D:
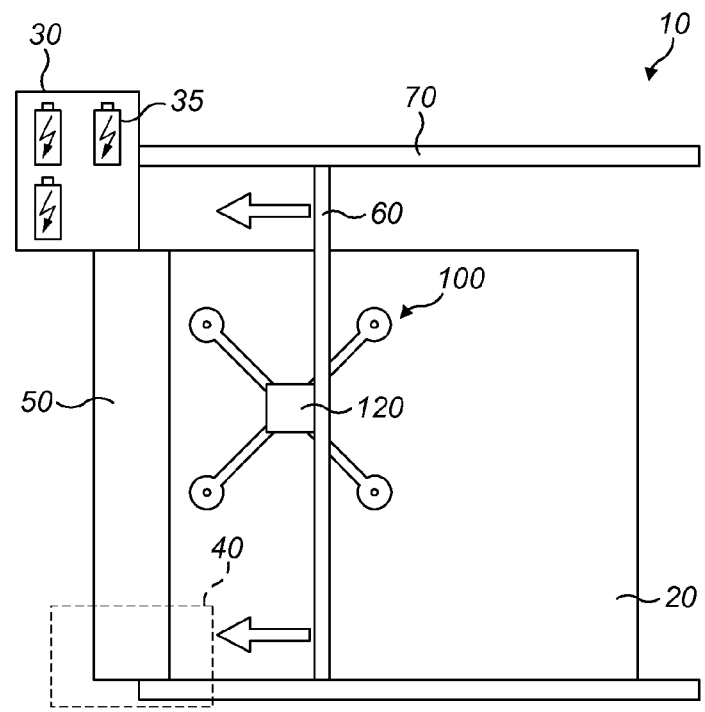

The manner of use of the autonomous battery replacement station 10 will now be described with reference to FIGS. 3a-3i and the flowchart of FIG. 4. In FIGS. 3a-3i, the four rotors 110a-110d of the UAV 100 are shown.

At step 400, the UAV 100 continuously monitors onboard battery levels. When a minimum battery level threshold is reached, a "go home" task is commenced. This may be done either through onboard monitoring of the battery levels and the generation of a "go home" task using logic programmed into the onboard UAV processor, or by continuous transmission of a battery level indication signal from the UAV to a processor at the autonomous battery replacement station 10 or even elsewhere.

Once the UAV 100 arrives 410 at the autonomous battery replacement station 10, it alights upon the landing pad 20. This is shown in FIG. 3a. At this point, the UAV body 120 may be orientated at any angle to the station.

Once the UAV 100 is upon the landing pad 20, it signals to the autonomous battery replacement station 10 to commence a battery swap procedure. This is shown at step 420 in FIG. 4. Upon receipt of that signal, a processor within the autonomous battery replacement station 10 (not shown) starts the linear actuator 70 to drive the bar 60 across the landing pad 20 towards the UAV 100. This is shown at step 430 in FIG. 4. At step 430 of FIG. 4, and as illustrated in FIG. 3b, the bar 60 comes into contact with the legs of the UAV 100. At this point it engages a leading leg and further driving of the bar 60 across the landing pad 20 causes the UAV 100 to rotate and orientate itself in a predetermined direction relative to the autonomous battery replacement station 10. This is shown at step 440 in FIG. 4 and in FIG. 3c.

The bar 60 continues to drive the UAV across the landing pad 20 towards the conveyor belt 50 at the edge of the landing pad 20. This is shown in FIG. 3d and at step 450 in FIG. 4.

Figure 3E:
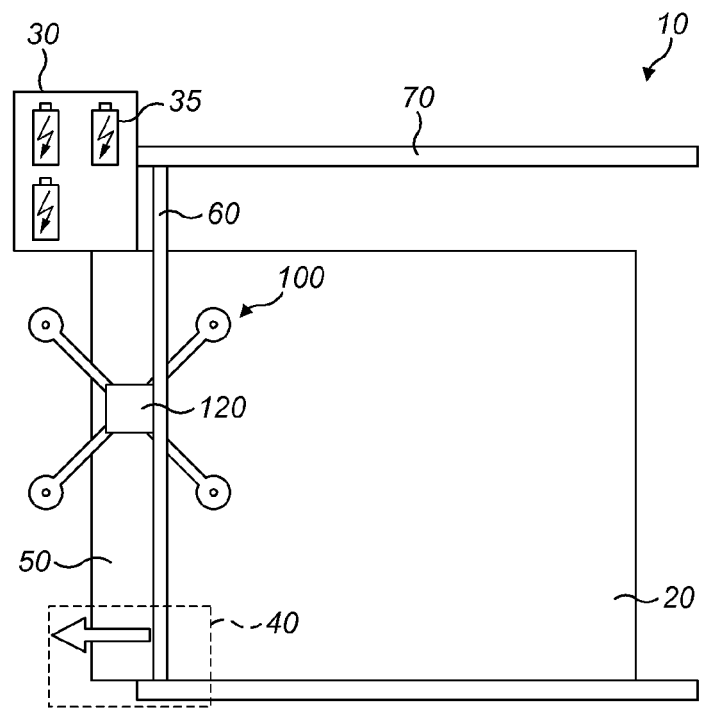
Figure 3F:
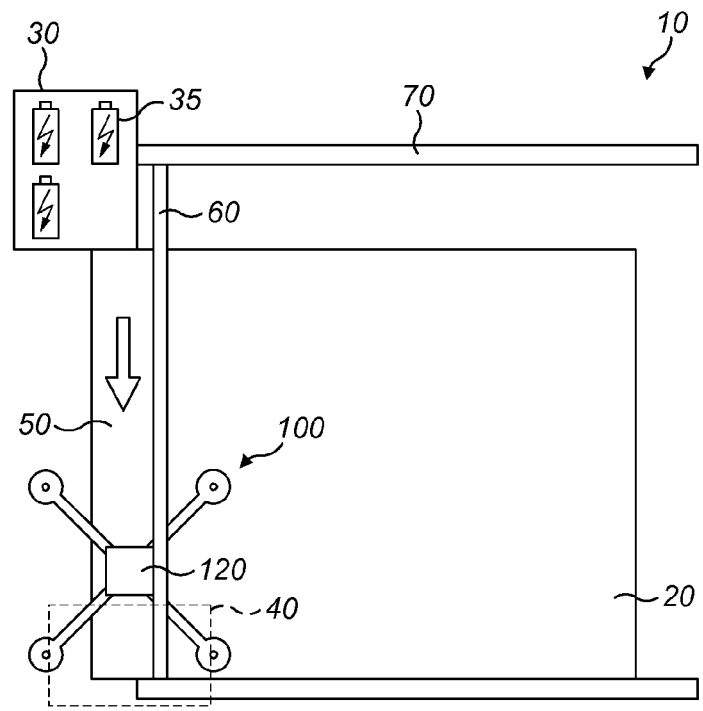
Figure 4:
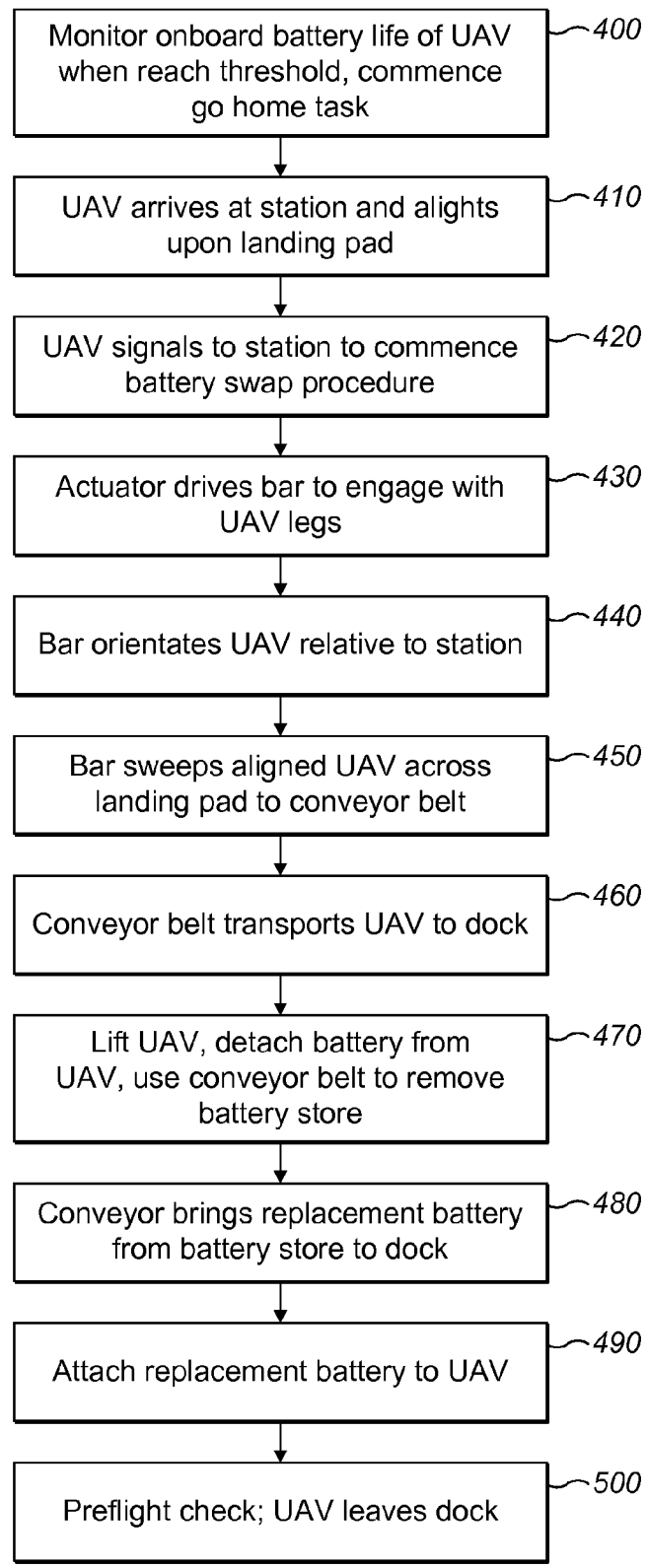
FIG. 4 shows a flowchart illustrating the steps taken in replacing the UAV battery according to FIGS. 3a-3j.

Upon arrival at the conveyor belt 50, and as shown in FIG. 3e, the UAV 100 remains aligned at a predetermined orientation relative to the station and, thus, the conveyor belt. That orientation is retained as the UAV 100 is then moved along the conveyor belt in a direction towards the dock 40 which is at an end of the conveyor belt distal from the battery storage location 30. This is shown in FIG. 3f and at step 460 of FIG. 4.

Figure 3G:
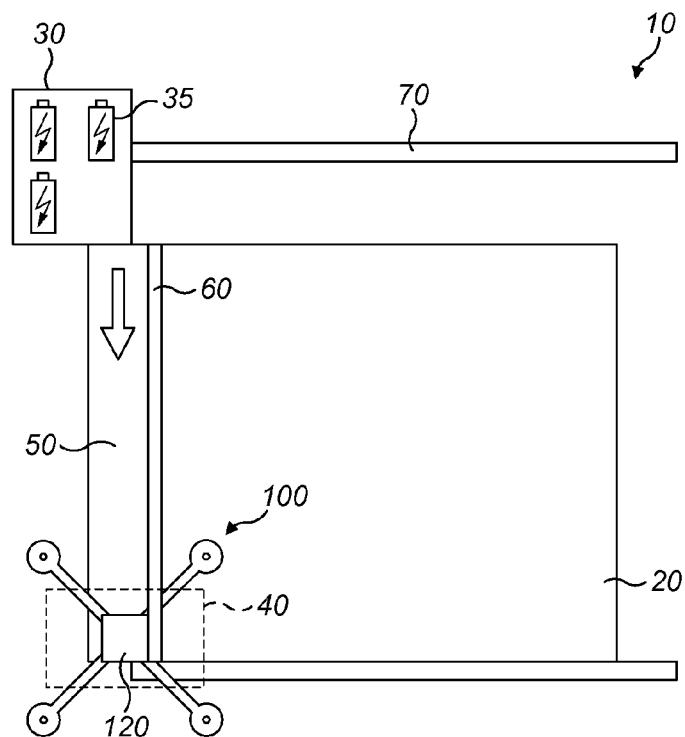
Figure 3H:
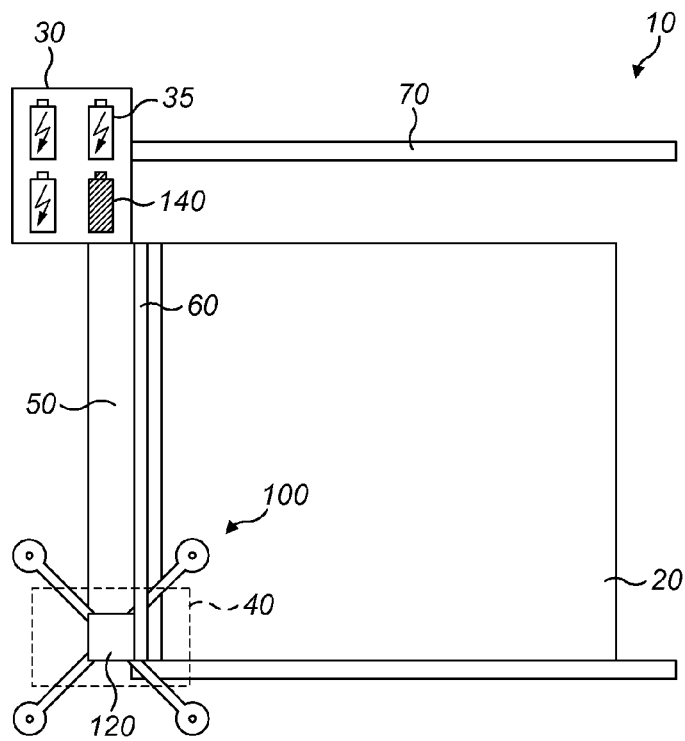

Eventually, the UAV arrives at the dock 40 as shown in FIG. 3g. At this point, robotic arms, for example, lift the UAV up and away from the conveyor belt, while retaining the predetermined orientation of the UAV body 120 relative to the autonomous battery replacement station 10.

Once the UAV 100 has been raised away from the conveyor belt 50, the UAV battery 140 on the UAV 100 is removed from the UAV in a manner to be described further in connection with FIGS. 5 to 8 below. The discharged UAV battery 140 drops from the UAV body 120 and onto the conveyor belt 50. The conveyor belt is driven in the opposite direction to the previous direction so as to transport the de-energised UAV battery 140 from the dock 40 to the battery storage location 30. Here it is stored and this may be seen in FIG. 3h. The step is illustrated in step 470 of FIG. 4. As previously explained, the discharged UAV battery 140 may be recharged through charging means (not shown) built into the battery storage location 30.

Once the discharged UAV battery 140 has been transported from the UAV 100 to the battery storage location 30, a replacement battery 35 is moved from the battery storage location 30, again for example using a robotic arm (not shown) and onto the conveyor belt 50. Shown at step 480 of FIG. 4, the conveyor belt is then driven in a first direction once more to transport the replacement battery 35 from the battery storage location 30 to the dock 40. The replacement battery 35 arrives at the dock 40 in a predefined orientation with respect to the dock 40, the UAV 100, and the landing platform or pad 20.

Figure 3I:
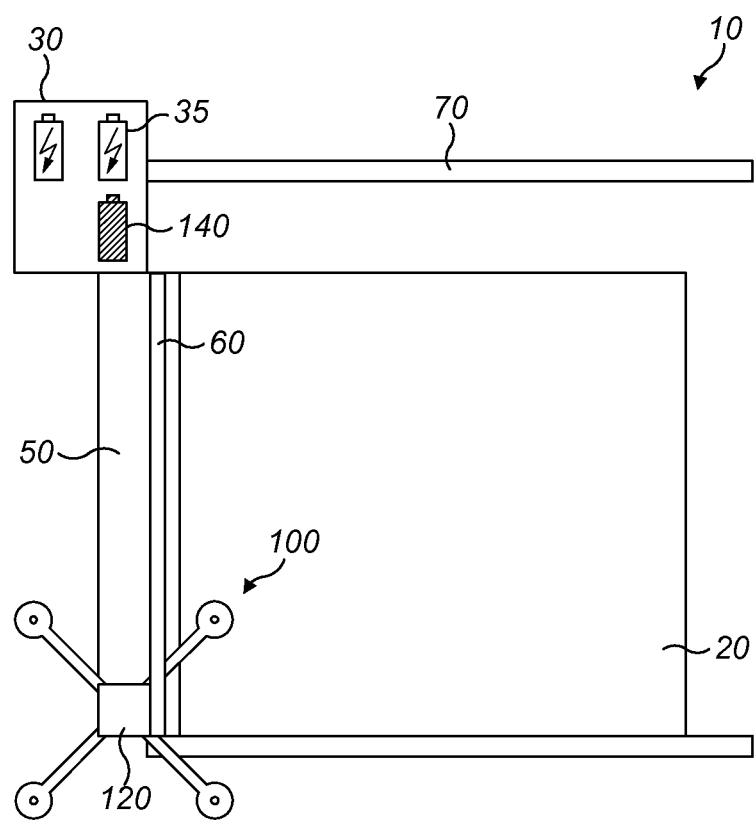

At step 490, once the replacement battery 35 arrives at the dock 40, it is mounted onto the UAV 100, again in a manner to be explained below in connection with FIGS. 5-9. Finally, at step 500 and as shown in FIG. 3i, once the replacement battery 35 has been successfully attached to the UAV 100, onboard processors, or a processor at the autonomous battery replacement station 10 or elsewhere, carry out routine pre-flight checks, after which the UAV is able to leave the dock 40 of the autonomous battery replacement station 10 for further flights.

By repetition of this process when the replacement battery 35 has, itself, reached a point of critical discharge, it will be understood that the UAV 100 can operate quasi continuously, in the sense that no human or manual intervention is needed in the autonomous battery replacement technique described above. This provides several advantages. Firstly, since embodiments of the present invention take an entirely different approach to the prior art approach of maximising flight time, it is possible to set a relatively conservative lower threshold for battery charge so that the risk of the UAV running out of power before returning to base is reduced. Secondly, even though, of course, the UAV must return to the autonomous battery replacement station 10 repeatedly to replace its batteries, because the whole process is autonomous it is possible to pre-program or preselect a strategy for reconnaissance that builds in the return of the UAV to the autonomous battery replacement station 10 for battery replacement as part of the reconnaissance strategy. For example, the UAV could carry out surveillance in a first sector and then move to a second sector via the autonomous battery replacement station 10 for replacement of a battery. In that case, it may be efficient to replace the battery at different levels of discharge, the timing of the battery replacement being dictated by the overall reconnaissance strategy rather than battery charge per se.

Furthermore, it will be understood in particular from FIGS. 3b and 3c that a simple and inexpensive technique for alignment of the UAV and its body relative to the station is employed. By aligning the UAV and body in the manner described and then retaining that alignment throughout the further procedures, the UAV can be caused to arrive at the dock 40 with the body of the UAV, and hence the battery, at a fixed, predetermined orientation relative to the station. This allows a swapping the battery for a replacement battery relatively straightforwardly, since the replacement battery can be transported to the dock in a known alignment which orientates itself correctly with the known orientation of the UAV in the dock 40.

Nevertheless, it will be understood that orientation of the UAV on the landing pad 20 is a desirable but not essential feature of the invention. Manipulation/rotation of the UAV upon arrival at the dock or on the conveyor belt 50 could, instead, be anticipated, again using robotics with suitable control strategies.

Turning next to FIGS. 5-9, a battery attachment/detachment mechanism to permit an autonomous swapping of the battery on the UAV is now described.

Figure 5:
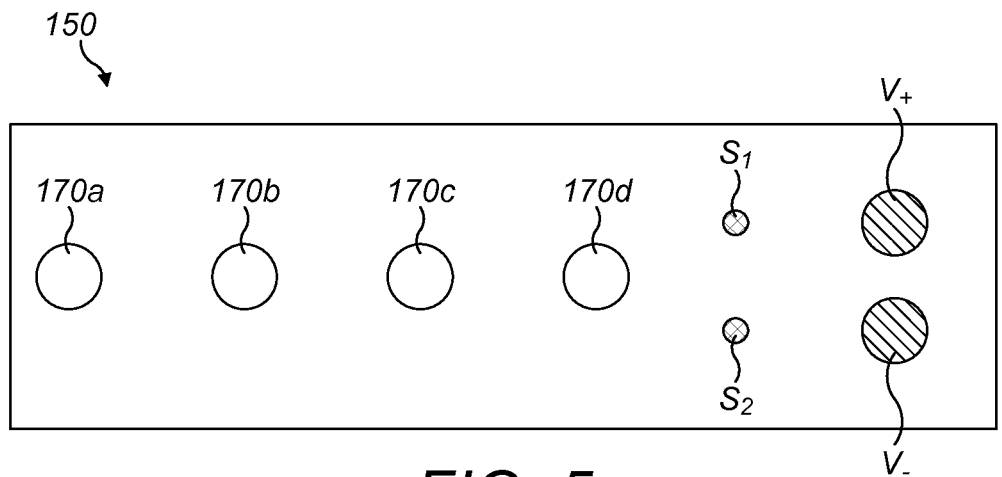
FIG. 5 shows, schematically, a bottom view of a UAV adapter mounted upon a UAV such as is shown in FIG. 2.

FIG. 5 shows a bottom view of a UAV adaptor 150 mounted upon the UAV 100 (shown in FIG. 2) for holding the UAV battery 140 on the UAV 100. The UAV adaptor 150 comprises a plurality of conical permanent magnets 170a-170d mounted transversely along the UAV adaptor 150. The UAV adaptor 150 also includes positive and negative electrical connectors, labelled V+ and V− in FIG. 5, and first and second signal connections S1 and S2.

Figure 6:
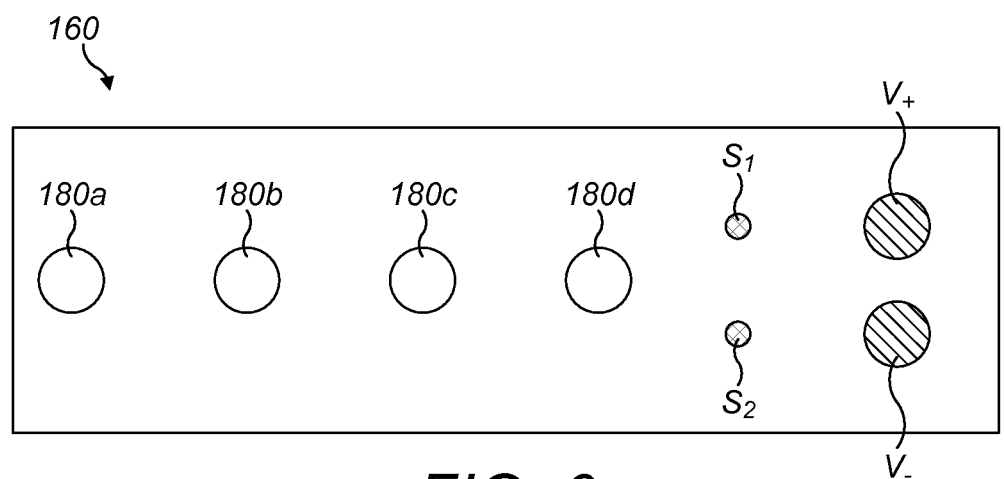
FIG. 6 shows, schematically, a top view of a battery adapter mounted upon a battery for mounting upon the UAV of FIG. 2.

A complementary battery adaptor 160 for the UAV battery 140/replacement battery 35 is shown in FIG. 6. Here, a plurality of electromagnets 180a-180d are provided, again transversely along the battery adaptor 160, and spaced so as, in use, to mate with the conical permanent magnets 170a-170d in the UAV adaptor of FIG. 5. Again, the battery adaptor 160 of FIG. 6 is provided with positive and negative electrical contacts V+ and V−, together with signalling contacts S1 and S2.

The conical permanent magnets 170a-170d shown in FIG. 5 are, for example, permanent permalloy magnets. The positive and negative electrical connections V+ and V− are internally wired to the UAV power connector (not shown) and the two signalling contacts allow battery release signals to be input to the UAV adaptor 150 of FIG. 5 and the battery adapter 160 of FIG. 6.

The battery adaptor 160 of FIG. 6 contains integrated electronics (not shown) to control the electromagnets 180a-180d. Again, the battery contacts V+ and V− are internally wired to the respective power connector of the battery.

The number of electromagnets 180a-180d provided on the battery adaptor 160 is selected to match a number of permanent magnets 170a-170d mounted upon the UAV adaptor 150. The number and field strength of the electromagnets and permanent magnets is determined based upon the weight of the battery.

Figure 7:
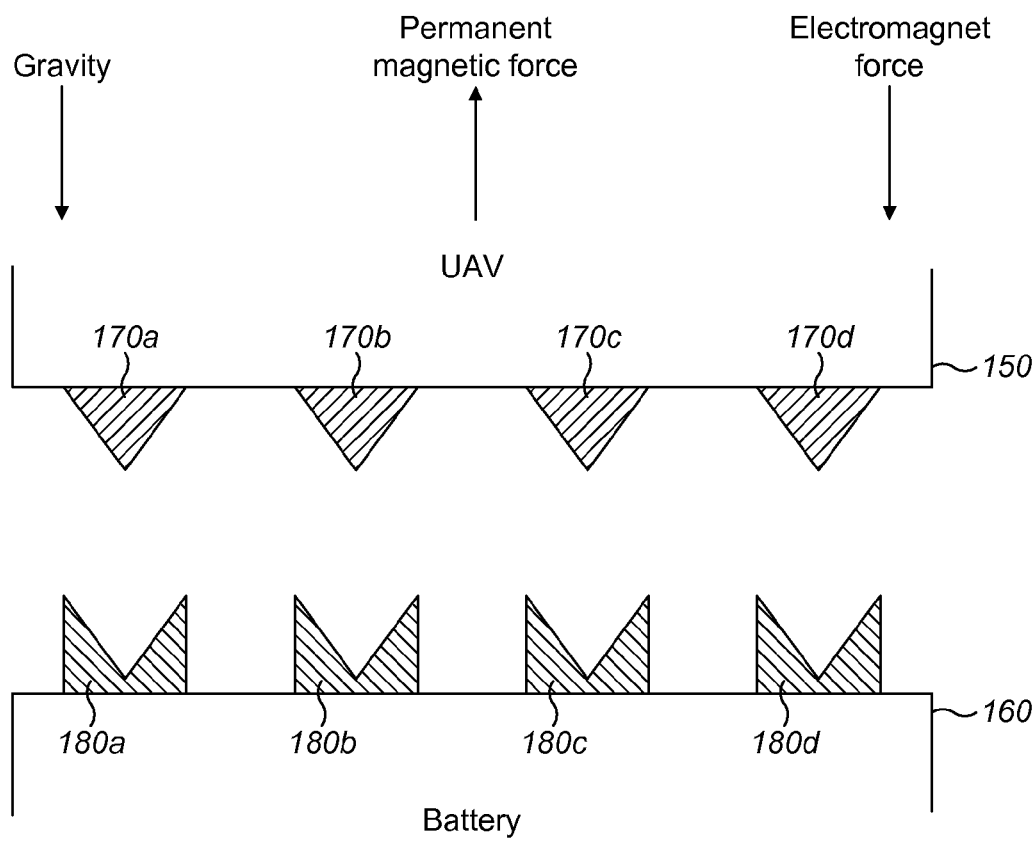
FIG. 7 shows, again schematically, and in side view, the UAV adapter and the battery adapter, in a first, released position.
Figure 8:
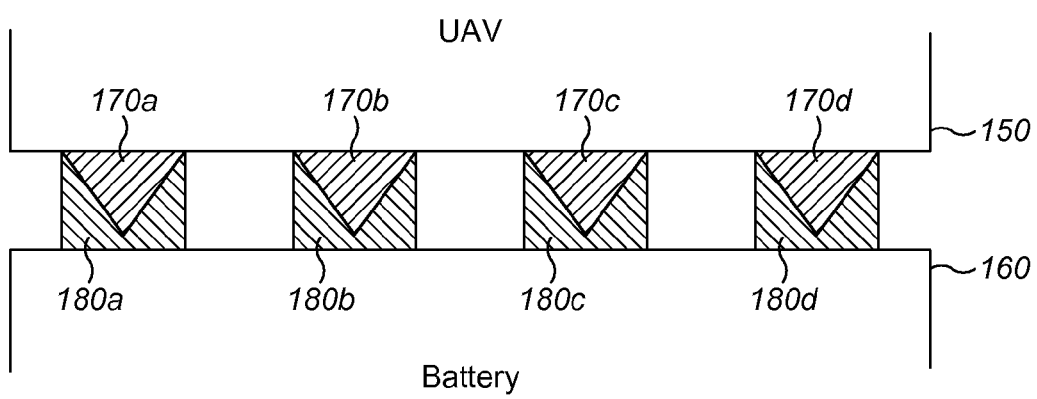
FIG. 8 shows, again schematically, and in side view, the UAV adapter and the battery adapter, in a second, holding position.

Turning now more particularly to FIGS. 7 and 8, the operating modes of the battery attachment/detachment mechanism are illustrated. As explained previously, the UAV adaptor 150 is mounted underneath the UAV body 120 so that the permanent magnets 170a-170d hang down from the underside of the UAV body 120. Thus, as indicated above FIG. 7, the force of gravity acts in a downwards direction, whereas the permanent magnetic force acts in an opposite, upwards direction. In order to allow disengagement of the battery from the UAV, the electromagnetic force, on the other hand, acts in a downwards direction, i.e., in tandem with the gravitational force.

FIG. 7 shows, in side view, the UAV adaptor 150 and the battery adaptor 160 in a first, released position. FIG. 8 shows a side view of the UAV adaptor 150 and the battery adaptor 160 in a second, holding position in which the permanent magnets 170a-170d engage with the electromagnets 180a-180d so that the battery is mounted upon the UAV 100.

As was explained in connection with step 470 of FIG. 4, when the UAV 100 has arrived at the dock 40 it is elevated by the use of simple levers so that the UAV no longer rests on the conveyor belt 50. The UAV 100 is then informed by the autonomous battery replacement station 10 that the battery swapping process can start, since, as explained, the UAV 100 has a data link.

Once shut down preparation has concluded a ready request is issued and this is received by the adaptors 150, 160 via the signalling connectors S1 and S2. At this point the battery is, of course, held in place by the permanent magnets 170a-170d whose magnetic attractive force (magnetic field strength) is sufficient to overcome the force of gravity acting on the mass of the battery suspended from the underside of the UAV body 120 of the UAV 100. The ready request prompts the circuitry within the battery adaptor 160 to energise the electromagnets 180a-180d. At this point, a magnetic force in a downwards direction (in the same direction as the force of gravity) results in a force in a downwards direction which exceeds the force in the upwards direction provided by the permanent magnets. This results in separation of the two adaptors so that the UAV battery 140 drops from the suspended UAV and onto the conveyor belt 50 where it can be transported to the battery storage location 30 as described in step 470 of FIG. 4.

The replacement battery 35 delivered by the conveyor belt 50 from the battery storage location 30 can be attached to the UAV 100 simply by bringing it into the dock 40 (where it is already aligned with the UAV 100 as explained above). The levers used to raise the UAV from the conveyor belt 50 when it first arrives in the dock with a battery attached can be used to raise the replacement battery 35 towards the bottom of the UAV 100. The replacement battery 35 also has a battery adaptor 160 and, at this stage, the electromagnets are not energised so that as the levers raise the replacement battery from the conveyor belt 50 towards the base of the UAV 100, magnetic attraction between the permanent magnets 170a-170d on the UAV adaptor 150 cause the battery adaptor 160 to engage with the UAV adaptor as shown in FIG. 8.

Once the replacement battery 35 is engaged with the UAV 100, a start up test procedure can commence and, once completed, the UAV can depart from the dock.

Although a specific embodiment has been described, the skilled reader will recognise that various modifications may be contemplated. For example, in the embodiment described and shown in the drawings, the battery storage location 30 is in a separate location to the dock 40 where battery swapping takes place, and a conveyor belt transports batteries between the two locations. It is, of course, feasible that the battery store and dock could be located in the same place so that the conveyor belt 50 may be omitted.

Moreover, although a linear actuator and bar arrangement has been described for the purposes of aligning and moving the UAV across the landing pad 20, other suitable arrangements, such as an overhead grab arm, could equally be employed.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An autonomous battery replacement station for an unmanned aerial vehicle (UAV), the UAV having a replaceable battery, said station comprising:
    (a) a landing platform configured to receive the UAV, said landing platform comprising a first edge and an opposite second edge;
    (b) a conveyor belt positioned adjacent said first edge of said landing platform, said conveyor belt extending from a first end to a second end, said conveyor belt configured to receive the UAV from said landing platform;
    (c) a storage location configured to store a replacement battery for the UAV, said storage location proximate said first end of said conveyor belt;
    (d) a moveable member operable to sweep across said landing platform from proximate said second edge to proximate said first edge such that the UAV is delivered from said landing platform to said conveyor belt; and
    (e) a means for selectively retaining the UAV proximate said second end of said conveyor belt during operation of said conveyor belt.

2. The station of claim 1, further comprising a driving means operable to drive said moveable member such that said moveable member urges the UAV across said landing area such that the UAV is received by said conveyor belt.

3. The station of claim 1, wherein said conveyor belt is selectively operable in each of a first direction and an opposite second direction.

4. The station of claim 3, wherein said conveyor belt is operable in the first direction to transport the replacement battery from said storage location to proximate said second end of said conveyor belt.

5. The station of claim 3, wherein said conveyor belt is operable in the first direction to transport the received UAV to proximate said second end of said conveyor belt.

6. The station of claim 3, wherein said
    conveyor belt is operable in the second direction to transport the replaceable battery removed from the UAV from proximate said second end of said conveyor belt to said storage location.

7. The station of claim 1, wherein the UAV comprises at least one projection, said moveable member is further configured to engage with the at least one projection to align the UAV in a predetermined UAV orientation with respect to said landing platform when said moveable member sweeps across said landing platform from proximate said second edge to proximate said first edge.

8. The station of claim 7, wherein said means for selectively retaining the UAV proximate said second end of said conveyor belt is configured to maintain the UAV in the predetermined UAV orientation.

9. The station of claim 1, wherein said means for swapping the replaceable battery with the replacement battery comprises:
    (i) a means for determining that the UAV is located proximate said second end of said conveyor belt;
    (ii) a means for causing the replaceable battery to disengage from the UAV while the UAV is located proximate said second end of said conveyor belt; and
    (iii) a means for causing the replacement battery to engage with the UAV.

10. The station of claim 9, wherein the replaceable battery is engageable with the UAV by at least one permanent magnet, and wherein said means for causing the replaceable battery to disengage from the UAV comprises an electromagnet configured to overcome a magnetic attractive force generated by the at least one permanent magnet.

11. An autonomous battery replacement system for an unmanned aerial vehicle (UAV), the UAV having a replaceable battery, said battery replacement system comprising:
   (a) a landing platform configured to receive the UAV, said landing platform comprising a first edge and an opposite second edge;
   (b) a conveyor belt positioned adjacent said first edge of said landing platform, said conveyor belt configured to receive the UAV from said landing platform and deliver the UAV to a dock;
   (c) a moveable member operable to sweep across said landing platform from proximate said second edge to proximate said first edge such that the UAV is delivered from said landing platform to said conveyor belt; and
   (d) a means for swapping the replaceable battery on the UAV at said dock with a replacement battery.

12. The system of claim 11, wherein said conveyor belt is further configured to transport the replacement battery from a storage location to said dock in a predetermined battery orientation.

13. The system of claim 11, wherein said conveyor belt is further configured to transport the replaceable battery from said dock to a storage location.

14. The system of claim 11, wherein said moveable member is configured to deliver the UAV to said conveyor belt in a predetermined UAV orientation.

15. The system of claim 14, wherein said moveable member is configured to engage with at least one projection on the UAV such that the UAV is aligned in the predetermined UAV orientation.

16. A method of autonomously replacing a replaceable battery in an unmanned aerial vehicle (UAV) comprising the steps of:
   (a) receiving the UAV upon a landing platform of a battery replacement station, the landing platform including a first edge and an opposite second edge;
   (b) moving a moveable member from proximate the second edge to proximate the first edge such that the UAV is received by a conveyor belt located along the first edge;
   (c) transporting the UAV to a battery replacement location using the conveyor belt;
   (d) detecting a presence of the UAV at the battery replacement location;
   (e) detaching the replaceable battery from the UAV; and
   (f) automatically attaching a replacement battery to the UAV.

17. The method of claim 16, further comprising transporting the replacement battery from a battery storage location to the battery replacement location using the conveyor belt.

18. The method of claim 16, further comprising transporting the replaceable battery from the battery replacement location to a battery storage location using the conveyor belt.

19. The method of claim 16, wherein moving the moveable member from proximate the second edge to proximate the first edge further comprises orientating the UAV in a predetermined UAV orientation with respect to the battery replacement location.

20. The method of claim 16, further comprising orientating the replacement battery in a predetermined battery orientation with respect to the battery replacement location.

* * * * *